Feb. 2, 1932.  F. J. OVEN  1,843,297
GASKET
Filed Oct. 30, 1929
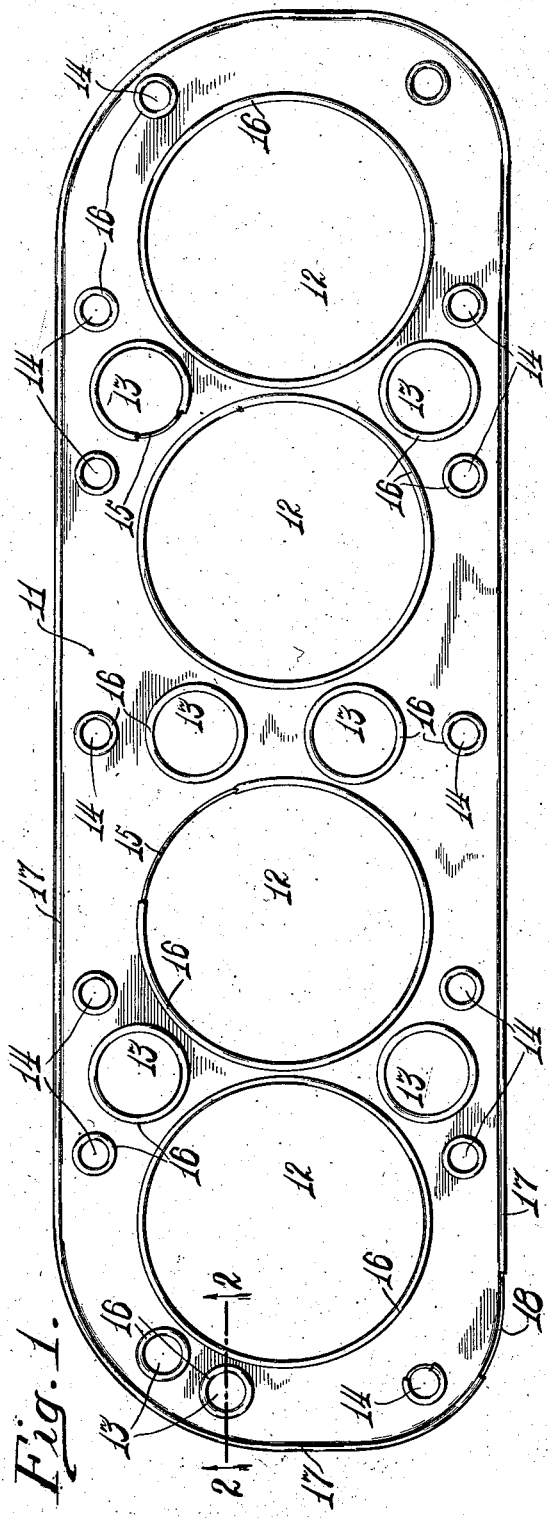
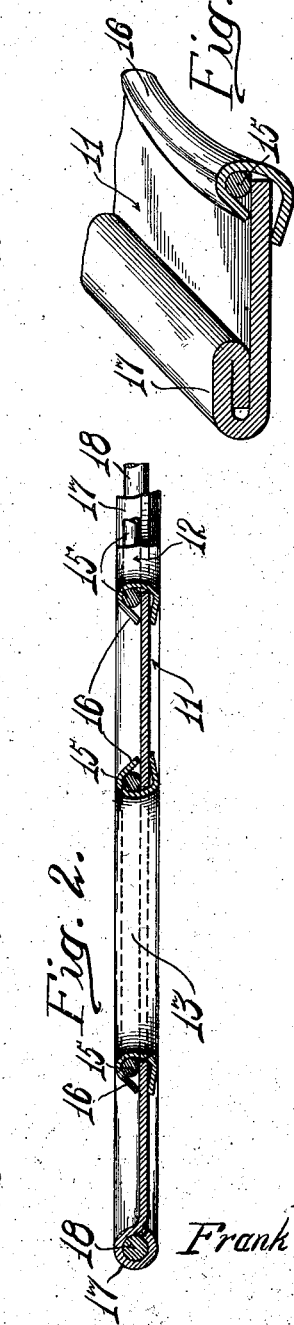
Inventor.
Frank J. Oven
Daniel B Brennan
Attorney Patented Feb. 2, 1932

1,843,297

UNITED STATES PATENT OFFICE

FRANK J. OVEN, OF CHICAGO, ILLINOIS, ASSIGNOR TO VICTOR MANUFACTURING & GASKET CO., A CORPORATION OF ILLINOIS

GASKET

Application filed October 30, 1929. Serial No. 403,520.

This invention relates in general to gaskets, and more particularly to gaskets for use in the presence of high temperatures and pressures and susceptible of being distorted to form a tight seal, the invention having particular utility for sealing joints in an internal combustion engine as, for example, between the cylinder block and head.

The sealing effect of a cylinder head gasket is principally localized about the openings therein, particularly those openings which register with the cylinders and water ports of the cylinder block and head, and it is the object of my invention to provide a gasket suitable for the purpose and having the sealing elements connected in a unitary structure by a relatively inexpensive material as heat resisting and durable for its purpose as copper, and thereby materially reducing the cost of manufacture of the gasket. And further objects of the invention are to provide sealing elements about the openings in the body of the gasket made of soft metal rings, and metal retaining means which are easily applied for holding the rings in place and are compressible with the rings; and also to provide means at the marginal edge to reenforce and strengthen the gasket.

In the accompanying drawings:

Fig. 1 is a plan view of a cylinder head gasket embodying the invention.

Fig. 2 is a sectional view on the line 2—2 of Fig. 1.

Fig. 3 is a fragmental sectional view showing the gasket unreenforced at its outer edge.

Fig. 4 shows a modified form of the invention.

Referring to the drawings, the body 11 is made preferably of inexpensive material such as sheet iron or steel and provided with the usual cylinder openings 12, water openings 13, and bolt openings 14. A seating member 15 is disposed on one side of the body about each of the openings therein, or as many of them as may be desired. This seating member is preferably made of copper wire, or other soft material, and it is shaped to correspond with the opening with which it is associated. The member 15 not only serves as a seating member on the gasket but it reenforces the gasket at the opening and particularly reenforces the wall of the gasket about the opening, and it also cooperates with other seating members to properly align the gasket with the parts of the joint in which it is used. Each seating wire is held in place on the marginal edge of the body about the opening therein by a retainer 16 which is made in the form of a tubular or other shaped flange extending through the opening and forming the wall thereof, one end of the flange being flared outwardly over the reenforce ring and being bent to engage its free edge with one side of the body, and the other end being flared and bent to engage its free edge with the other side of the body. This retaining flange is fitted sufficiently snug to hold the reenforce ring in fixed position on the body but it is not compressed upon the ring or upon the body, there being preferably a space about the ring between the adjacent marginal edge portion of the flange and the body and also a space between the other marginal edge portion of the flange and the body. The seating wire preferably overlaps the edge of the body slightly about the opening. The retainer flange is folded over the seating wire and this end of the wall of the opening has a slight flare whereas the other end of the wall of the opening has a greater flare. The construction is such that the seating wires are always retained in position on the gasket and these wires and their retaining flanges will be distorted under pressure to effect an efficient seal, the wall of the opening formed by the retainer flange being reenforced by the edge of the body about the opening therein and also by the ring which is forced into more or less distorted contact with the edge of the opening under the pressure employed for securing the gasket in place. The outer edge of the gasket may be provided with a bead 17 formed by rolling the margin of the body over a wire or other reenforcing member 18. The seating wires and their retainer flanges form aligning members about the openings in the gasket and the bead 17 forms an aligning member at the edge of the gasket and cooperates with the aligning members at the openings to distribute the pressure uniformly over the gasket and prevent uneven distribution of pressure and possible damage to the engine as well as to the gasket. The bead may be formed as shown at 17', Fig. 4, by folding the marginal edge of the body over and back upon itself on one side of the body. The invention enables the gasket to be made with a sheet iron or steel body, instead of the commonly used copper, with means located at the openings therein for aligning the gasket at the openings and reenforcing the walls of the openings and providing substantial seating means about the openings and producing an efficient seal. The gasket is also preferably beaded at its marginal edge to cooperate with the sealing means about the openings to align the gasket as a whole and assist in distributing the pressure evenly and uniformly.

I claim:

1. A gasket comprising a body having openings, an annular wire seating member adjacent to each of said openings, and double walled annular holding means for gripping said wire to secure it to said body portion, the outer circumferences only of said double walls engaging opposite sides of said body.

2. A gasket comprising a body made of a single sheet of metal and having openings therein, a separate means extending through each opening and secured directly to the marginal edges of the body about said openings and on both sides of the body to form a seat and seal for the gasket about said openings, said means at said openings in the gasket being spaced apart and also being of uniform thickness, and means at the marginal edge of the body of the same thickness as the seating and sealing means about the openings in the body and spaced therefrom to cooperate therewith for aligning the gasket in the joint in which it is used.

3. A gasket comprising a body made of a single sheet of metal and having an opening therein, and separate means secured directly to the marginal edges of the body about said opening and on both sides of the body to form a seat and seal for the gasket about said opening, said means comprising a reenforce member arranged on one side of the body and a retaining member extending through and forming the wall of the opening, said retaining member being flared at one end to overlie the reenforce member and having its flared edge turned to engage the side of the body, the other end of the retaining member being flared and engaged with the other side of the body.

4. A gasket comprising a body made of a single sheet of metal and having an opening therein, and means secured to the marginal edges of the opening and on both sides of the body to form a seat and seal for the gasket about said opening, said means comprising a reenforce member, and a tubular flange extending through the opening and having one end folded over the reenforce member and its edge engaged with one side of the body and having its other end folded over the marginal edge of the body at said opening with its edge engaged with the opposite side of said body.

In testimony whereof I affix my signature at 10 South La Salle Street, Chicago, Illinois.

FRANK J. OVEN.